A. S. VOGT.
WEIGHING SCALE.
APPLICATION FILED JAN. 22, 1920.

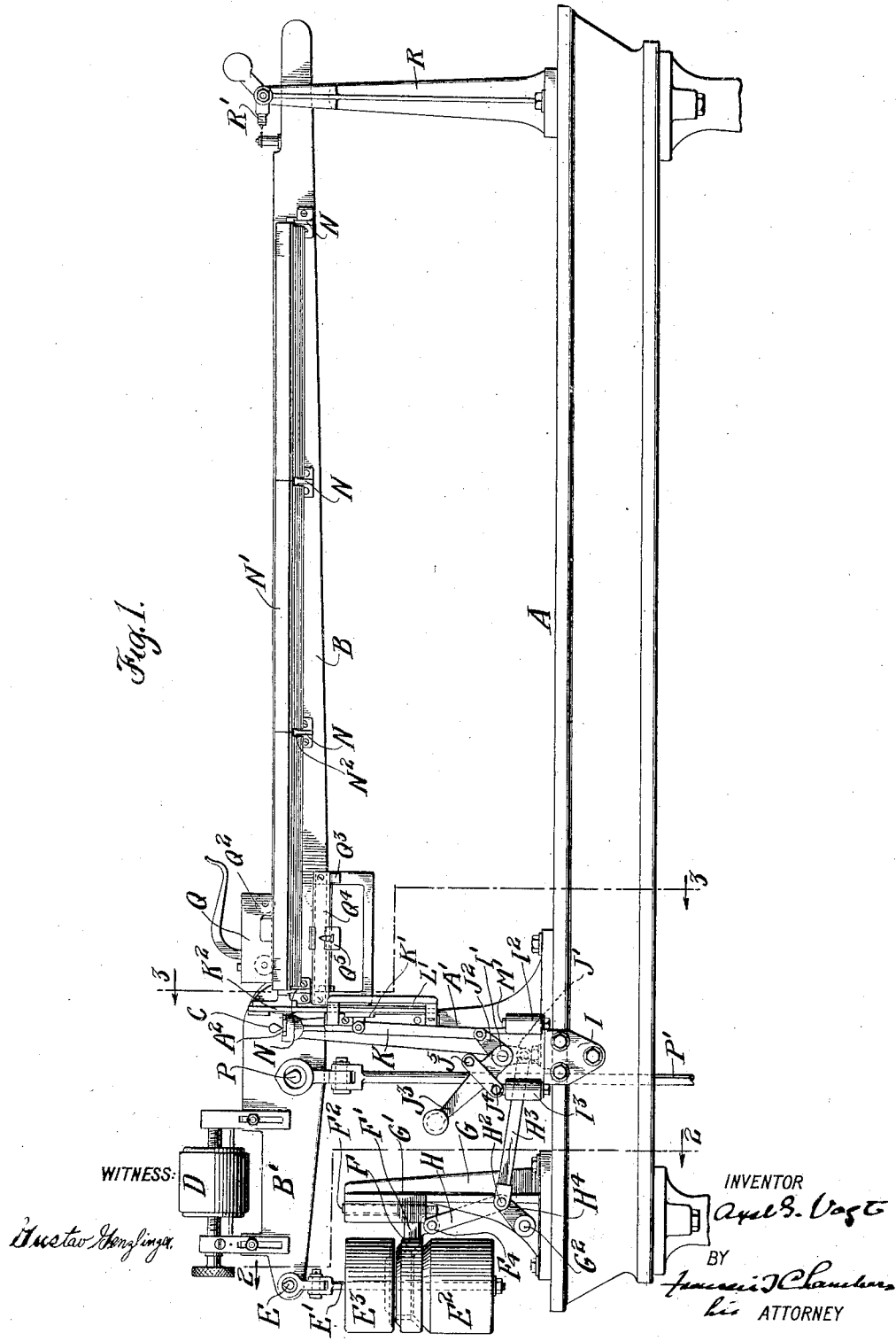

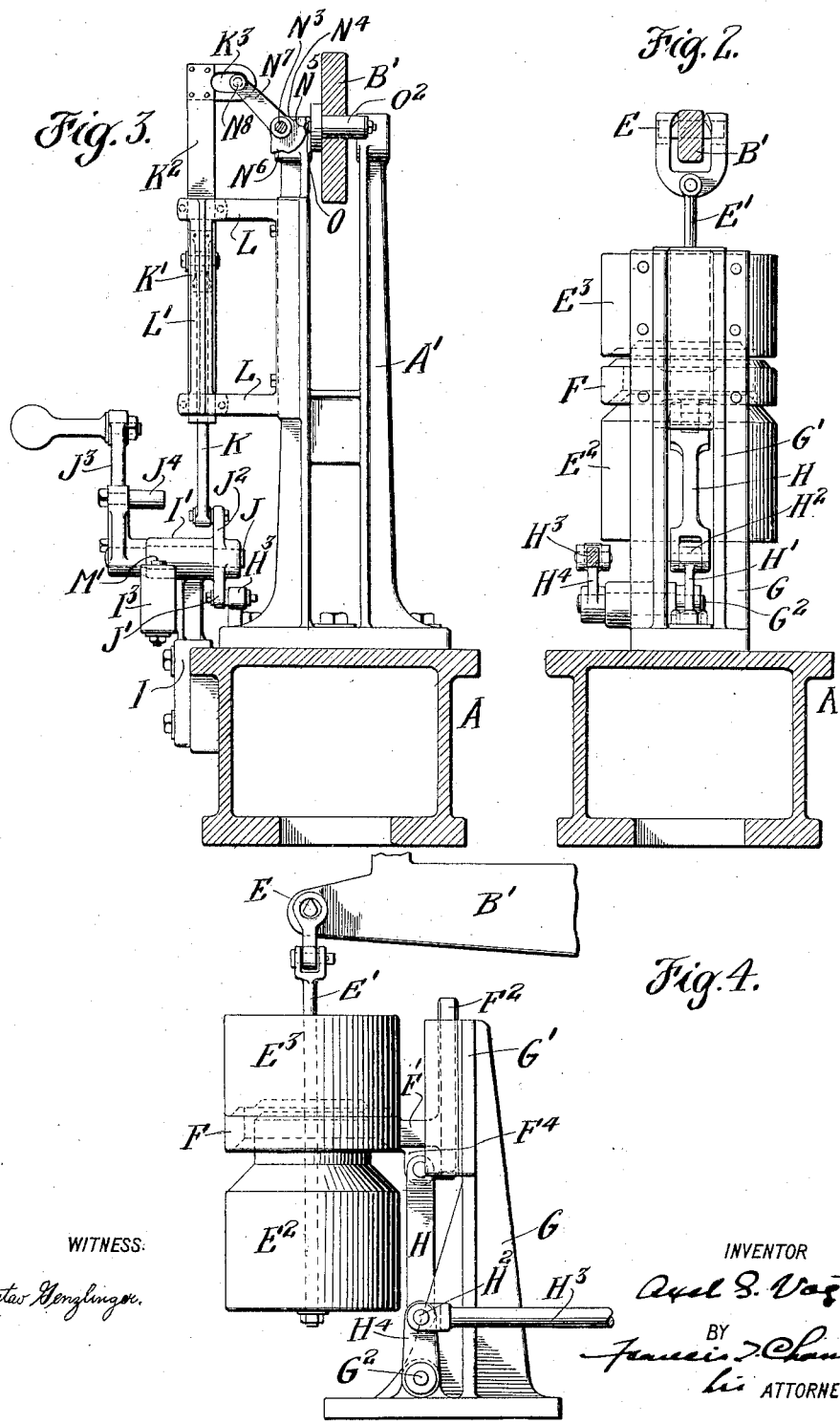

1,347,605.

Patented July 27, 1920.
4 SHEETS—SHEET 3.

WITNESS:
Gustav Genzlinger.

INVENTOR
Axel S. Vogt
BY
Francis J Chambers
his ATTORNEY

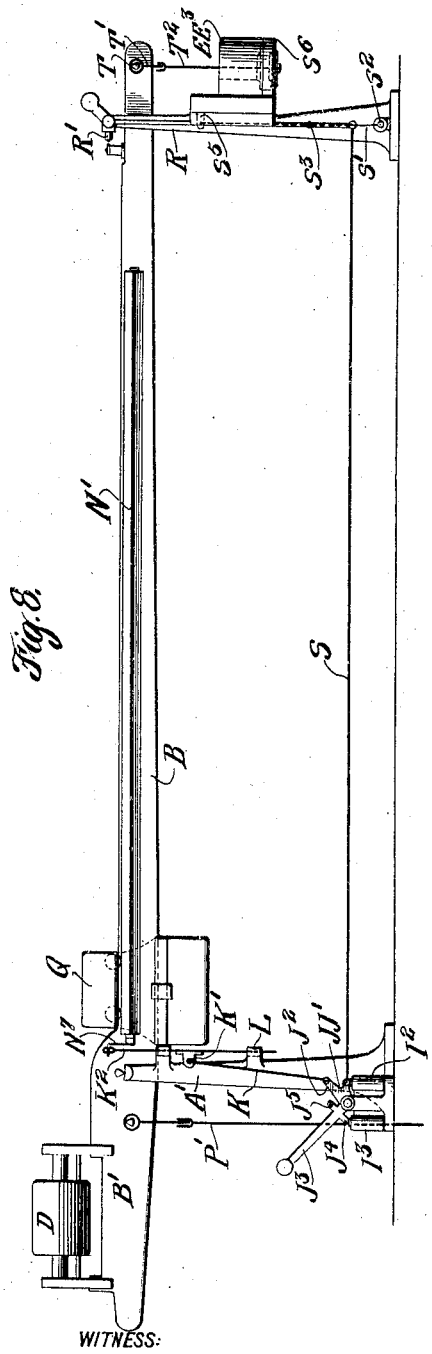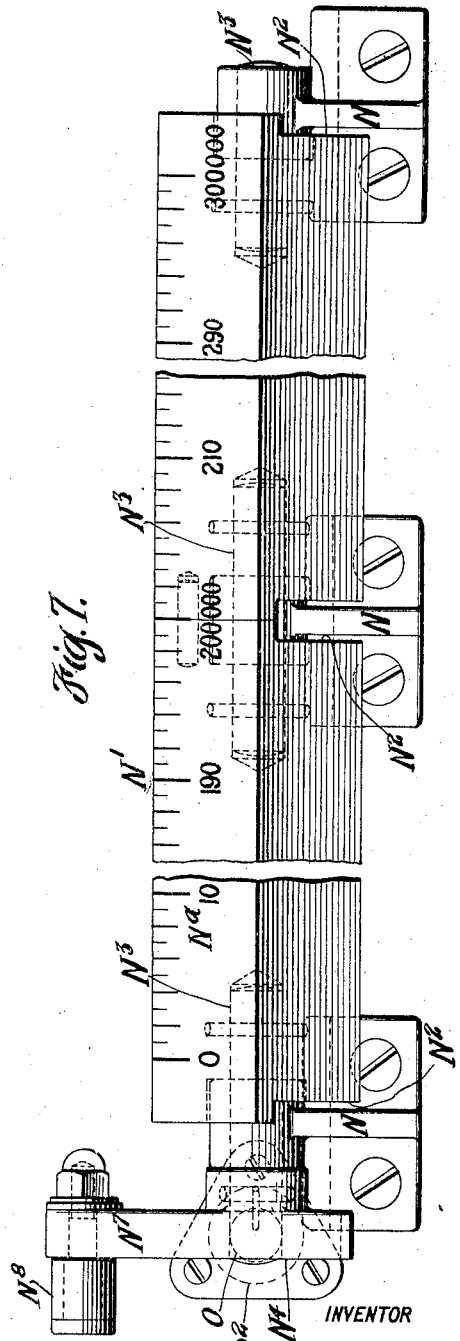

UNITED STATES PATENT OFFICE.

AXEL S. VOGT, OF PHILADELPHIA, PENNSYLVANIA.

WEIGHING-SCALE.

1,347,605.  Specification of Letters Patent.  Patented July 27, 1920.

Application filed January 22, 1920. Serial No. 353,292.

*To all whom it may concern:*

Be it known that I, AXEL S. VOGT, a subject of the King of Sweden, residing in the city and county of Philadelphia, in the State of Pennsylvania, have invented certain new and useful Improvements in Weighing-Scales, of which the following is a true and exact description, reference being had to the accompanying drawings, which form a part thereof.

My invention relates to weighing scales, particularly to scales such as railroad track scales, designed to weigh very heavy weights, and which are called upon at times to weigh cars or other objects of widely different weight. Scales of the kind referred to are provided with indicating scales to be read in connection with an index finger on a sliding poise and, without making the weighing beam and index scale impracticably long, neither the beam nor the indicating scale can be made long enough to properly weigh all of the varying weights which come upon the scale; consequently the beams and indicating scales are made of such length and so graded that they will take care of the ordinary weights which come upon the scale, and for extraordinary, or, so to speak, abnormal weights, the scale beams are provided with counterpoise weights which may be applied on either side of the fulcrum of the beam and by applying or removing which the beam is made capable of weighing such abnormally heavy weights. But where such counter weights are employed the index scale prepared for the normal or ordinary weights no longer shows the actual weight and an addition equivalent to the weighing value of the counter weight must be made to the indicated weight shown on the index. The object of my invention is to provide beam scales having counter weight attachments with a movable index scale support, having two index scales inscribed upon or secured to it, and with mechanism adapted to apply or remove a counterweight from the scale beam and to automatically shift the index scale support so that it will present to the index finger on the sliding counterpoise an index scale which will correctly show the weight whether the weight is within the normal range of the scale or within the excess range provided for by the manipulation of the counter weight.

The nature of my invention and the mechanism devised to carry it into useful effect will be best understood as described in connection with the drawings in which it is illustrated and in which—

Figure 1 is a side elevation of the upper portion of the beam scale constructed in accordance with my invention.

Fig. 2 is a view taken on the cross section line 2—2 of Fig. 1 on a somewhat larger scale looking toward the left.

Fig. 3 is a cross section on the line 3—3 of Fig. 1, on a somewhat larger scale, looking toward the left.

Fig. 4 is a side elevation on a somewhat larger scale from Fig. 1 showing the counterweight raising mechanism and counterweight in elevated position.

Figures 5, 6:
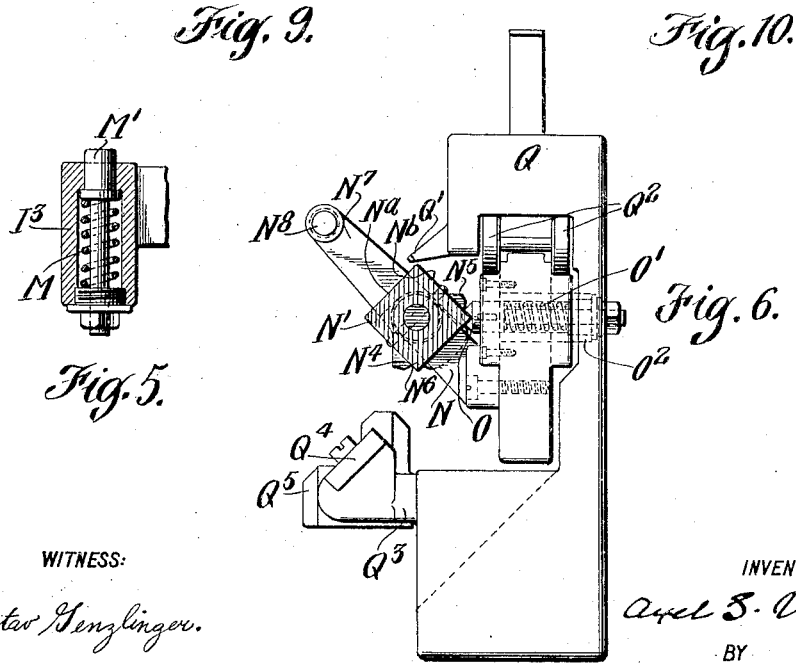
Fig. 5 is a sectional elevation through one of the spring containing boxes $I^3$ to be hereafter described.

Fig. 6 is an end view of the scale beam and the sliding counterpoise moving upon it, one of the brackets supporting the index scale support being shown as attached to the scale beam, such index scale support being shown in section, and the detent segment by which it is held in proper registering position, being indicated partly in solid and partly in dotted lines the purpose of the view being particularly to show the relation of the detent segment to the index scale support.

Fig. 7 is an elevation on a larger scale of the index support and mechanism directly connected with it.

Fig. 8 is an elevation showing the application of my invention to scale constructions in which the counterpoise weight is applied at the right hand end of the scale beam, the view being somewhat diagrammatic.

Figures 9, 10:
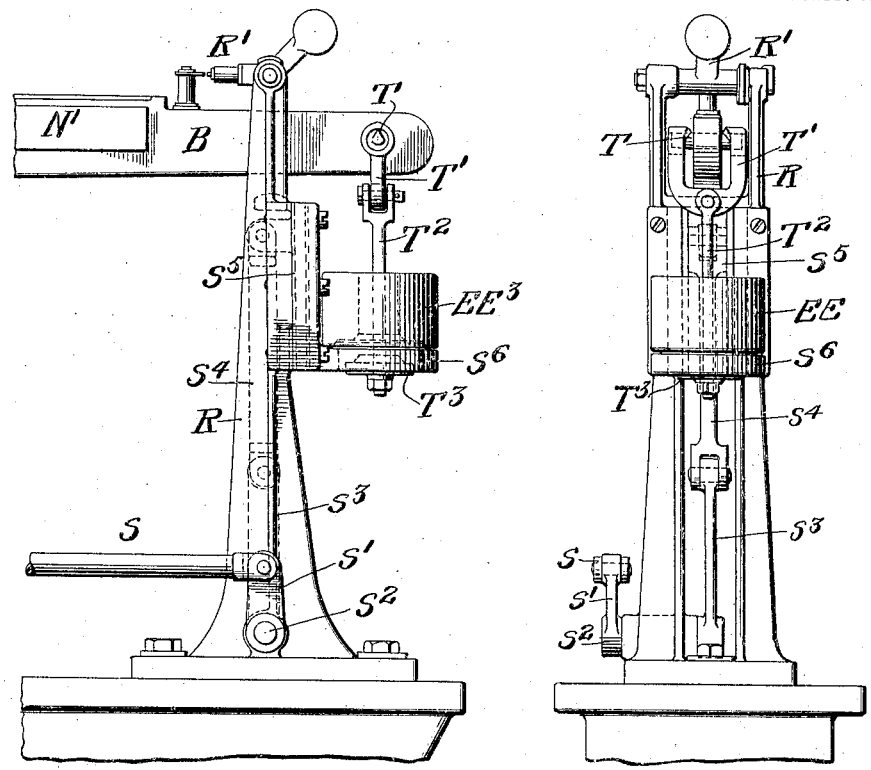

Fig. 9 is an elevation on a larger scale and in more detail of the mechanism indicated in Fig. 8, for raising and lowering the counterpoise, and Fig. 10 is an end view of the mechanism shown in Fig. 9.

A is the base, or frame, upon which the scale beam is supported, A′ indicating a standard secured on the base A and supporting the knife edge block $A^2$ at its upper end. B and B′ indicate the long and short arms of the scale beam and C′ the knife edge pivot of the beam which rests upon the block $A^2$. D is an adjusting weight secured to the short arm of the scale beam.

E is a knife edge pivot secured at the end of the arm B′ of the scale beam and supporting the depending rod E′, having secured to its lower end a counterpoise weight E². E³ is a second counterpoise weight to be lifted when weights above the normal are to be cared for and normally resting on weights E² and raised when desired by an annular supporting ring F, attached through an arm F′ to a vertical slide F², movable in guideways G′ in the standard G, having, as shown, a pivot pin F⁴ secured to it, to which is connected the link H, forming a toggle joint with the link H′, which is attached to the rock shaft G², which rock shaft has also attached to it the lever H⁴ to the free end of which is connected the link H³. The other end of the link H³ is attached to a lever arm J′ on rock shaft J, to which is also attached a lever arm J², best shown in Fig. 3, and an actuating lever arm J³, to which are attached the pins J⁴ and J⁵ for a purpose to be hereafter described. The lever arm J² is pivotally connected with the lower end of the link K, the upper end of which is attached to the slide K moving in a guideway L′, secured to brackets L, L, which are attached to the standard A′. The slide K′ has extending upward from it a rod K², see Fig. 3, supporting at its upper end the slotted plate indicated at K³.

N, N, etc., are a series of brackets secured to the scale beam B and serving as a support for the index support N′, which is slotted, as indicated at N², where necessary to give passage to the brackets N, and pivotally supported on said brackets through pins indicated at N³. The pivot pin N³, at the left hand side of the index support N′, is firmly secured to said support and after passing through the bracket N has secured to its left hand end the notched segment N⁴, having, as shown, two notches N⁵ and N⁶ formed on it, and has also secured to it the lever arm N⁷ from the end of which extends the pin N⁸ which lies within the slot of the plate K³, but is considerably less in diameter than the breadth or rather the depth of the slot. O is a locking pin which is pressed against the segment N⁴ by a spring O′, contained in the spring box O², which box is secured in the beam arm B.

Returning now to the actuating lever J³, and its two symmetrically disposed pins J⁴ and J⁵, the lever J³, as also the levers J′ and J², are secured to a rock shaft I′, which is supported in a bracket I, to which bracket, as shown, is also secured the two spring boxes I² and I³, in which are located springs M (see Fig. 5), acting to press upward the pins M′, the boxes and pins being so located that when the lever J³ is moved toward the left its attached pin J⁴ will come in contact with the pin M in the box I³, and when turned toward the right its pin J⁵ will come in contact with the pin M′ in the box I².

P is a knife edge pivot secured to the arm B′ of the scale beam and supporting the rod P′ by which connection is made to the lever system supporting the platform of the scale. Q is a sliding poise moving on the arm B of the scale beam, and having an index finger Q′ located so as to register with the scale on the scale support N′. Q² indicate the rollers interposed between the scale beam and the sliding poise. Q³, see Fig. 6, is a bracket extending from the poise Q and supporting an index scale indicated at Q⁴, on which slides a weight Q⁵, having an index finger registering with the scale Q⁴ in a manner which is quite usual in scales of this kind.

R is a standard at the right hand end of the platform A supporting the pivot dog R′, which is used to lock the scale beam in satisfactory position when it is not in use.

In the modification illustrated diagrammatically in Fig. 8, and somewhat in detail in Figs. 9 and 10, the counter poise weight used for abnormally heavy weights is applied at the right hand end of the scale beam E, E³ indicating the movable weight which is normally supported by a ring platform S⁶ extending out from the slide S⁵ supported in guideways on the standard R and moved up and down by a link S⁴ actuated by a lever arm S³ secured to a rock shaft S², to which is also secured a lever arm S′, which, through a link S is connected to a lever arm J, J′ attached to the rock shaft I² and taking the place, in which modified construction, of the lever arm J′ in the construction of Fig. 1. When the weight E, E³ is lowered it rests upon a platform T³ supported by a link T², which, in turn, is supported on a knife edge T on the end of the scale beam B.

In operation the scale support N′ is provided with two index scales Nᵃ and Nᵇ located on adjacent sides of the rectangular support, and for ordinary weighing the scale support lies in such a position that one of the index scales, Nᵃ for instance, registers with the index finger Q′ of the poise Q. As shown in the drawings, the scale is adjusted for use with normal weights, the counter poise E³ resting on the counter poise weight E², and to adjust the scale for abnormally heavy weights the lever J³ is moved toward the right, and acting through its lever arm J′, link H³, lever arm H⁴, rock shaft G², lever arm H′ and link H it moves the slide F′, and the attached ring platform F, upward lifting and supporting the counter weight E³ out of contact with the counter weight E², thus adapting the scale for weighing heavier weights, and at the same time, this movement of the lever J³, acting through the connected lever arm J² and link K moves the slide K' upward carrying with it, of course, the arm K² with its slotted extension K³, which acting on the pin N⁸ at the end of the lever N⁷, turns the index support through a sufficient angle, 90° as shown, to bring the other index N^b into registry with the index finger on the sliding poise.

The index support is yieldingly held in its two alternative positions by the engagement of the spring actuated pin O with the notches N⁵ or N⁶ on the segment N⁴.

It is obviously important that the pin N⁸ should not, during weighing, come in contact with the sides of the slotted plate K³, and in my construction such contact is provided against by the action of the spring actuated pins M', which as the lever J³ is moved from one position to the other are pressed down by contact with the pins J⁴ and J⁵, and when the lever J³ is released by the operator act to press the lever somewhat upward, thus shifting the slotted plate K³ to a position in which the pin N⁸ lies midway of the slot, so that it will not come in contact with either the top or bottom of the slot in the movement of the scale beam.

In the modified construction of Figs. 8, 9 and 10 the counter poise E, E³, is normally held out of contact with the supporting plate T³ and where abnormally heavy weights are to be cared for it is lowered into contact with this platform by the same movements already described of the actuating lever J³. In other respects the two devices are essentially the same and need not be further described in detail.

Having now described my invention, what I claim as new and desire to secure by Letters Patent, is:

1. In a beam scale having a sliding poise with an index finger and a counter poise weight by shifting which the weighing capacity of the scale can be increased, a shiftable index scale support having two index scales, one adapted to register with the index finger on the sliding poise in one position of the support and the other to so register in another position of the support, in combination with a counter poise weight lifting and lowering device, means for actuating said device and means for shifting the index scale support actuated by the mechanism which lifts and lowers the counter poise weight.

2. In a beam scale having a sliding poise with an index finger and a counter poise weight by shifting which the weighing capacity of the scale can be increased, a shiftable index scale support having two index scales, one adapted to register with the index finger on the sliding poise in one position of the support and the other to so register in another position of the support, in combination with a counter poise weight lifting and lowering device, means for actuating said device, means for shifting the index scale support actuated by the mechanism which lifts and lowers the counter poise weight, said means being loosely connected to the index scale support and mechanism for automatically shifting said means out of operative contact with the index scale support after it has acted to shift its position.

3. In a beam scale having a sliding poise with an index finger and a counter poise weight by shifting which the weighing capacity of the scale can be increased, a shiftable index scale support having two index scales, one adapted to register with the index finger on the sliding poise in one position of the support and the other to so register in another position of the support, in combination with a counter poise weight lifting and lowering device, means for actuating said device, means for shifting the index scale support actuated by the mechanism which lifts and lowers the counter poise weight, said means being loosely connected to the index scale support, mechanism for automatically shifting said means out of operative contact with the index scale support after it has acted to shift its position and means for yieldingly locking the index scale support in either of its alternative positions.

4. In a beam scale having a sliding poise with an index finger and a counter poise weight by shifting which the capacity of the scale can be increased, an index scale support pivotally secured to the scale beam and having two index scales adapted to register with the index finger on the sliding poise in alternative position of said support, mechanism for lifting and lowering the counter poise weight and simultaneously shifting the position of the index scale support, and means whereby the said support is automatically freed from operative contact with the mechanism which shifts its position at the end of each shifting movement.

AXEL S. VOGT.